(12) United States Patent
Li et al.

(10) Patent No.: US 11,891,677 B2
(45) Date of Patent: Feb. 6, 2024

(54) ADDITIVE FOR REDUCING THE ROASTING TEMPERATURE OF FLUXED MAGNETITE PELLETS AND A METHOD OF USING IT

(71) Applicant: NORTH CHINA UNIVERSITY OF SCIENCE AND TECHNOLOGY, Hebei (CN)

(72) Inventors: Jie Li, Tangshan (CN); Weixing Liu, Tangshan (CN); Aimin Yang, Tangshan (CN); Xiwei Qi, Tangshan (CN); Fuxing Yu, Tangshan (CN)

(73) Assignee: NORTH CHINA UNIVERSITY OF SCIENCE AND TECHNOLOGY, Tangshan (CN)

( * ) Notice: Subject to any disclaimer, the term of this patent is extended or adjusted under 35 U.S.C. 154(b) by 0 days.

(21) Appl. No.: 18/075,422

(22) Filed: Dec. 6, 2022

(65) Prior Publication Data

US 2023/0220513 A1    Jul. 13, 2023

Related U.S. Application Data

(63) Continuation of application No. PCT/CN2022/123804, filed on Oct. 8, 2022.

(30) Foreign Application Priority Data

Jan. 10, 2022    (CN) .......................... 202210019068.9

(51) Int. Cl.
*C22B 1/00*     (2006.01)
*C22B 1/26*     (2006.01)
*C22B 1/02*     (2006.01)
*C22B 1/24*     (2006.01)

(52) U.S. Cl.
CPC ................ *C22B 1/005* (2013.01); *C22B 1/02* (2013.01); *C22B 1/2406* (2013.01); *C22B 1/26* (2013.01)

(58) Field of Classification Search
CPC ......... C22B 1/005; C22B 1/02; C22B 1/2406; C22B 1/26
See application file for complete search history.

(56) References Cited

FOREIGN PATENT DOCUMENTS

| CN | 107326175 A  |   | 11/2017 |
|----|--------------|---|---------|
| CN | 109355494 A  |   | 2/2019  |
| CN | 113957240 A  |   | 1/2022  |
| JP | 04175263 A   | * | 6/1992  |
| WO | 2011136556 A2 |  | 11/2011 |

* cited by examiner

*Primary Examiner* — Scott R Kastler

(57) ABSTRACT

The present invention discloses additive for reducing the roasting temperature of fluxed magnetite pellets and a method of using it, consisting of components: $B_2O_3$, $Mn_2O_3$, the $B_2O_3$ and $Mn_2O_3$ are pure chemical reagents, the mass of the additive is 0.8%, 4% of the dry basis mass of the magnetite concentrate, respectively, the magnetite concentrate, bentonite clay, calcium flux and additives will be dosed with 12-14% water of the dry base mass ratio of the mixture, prepared into green pellets of 10-12.5 mm in diameter in a disc ball making machine, After the pellets are completely dried, preheat them for 15~20 min at 600~1000° C. to ensure that $Mn_2O_3$ is fully decomposed, then roasting is carried out for 15 min at 1200° C., and after roasting, the pellets are cooled to room temperature to obtain the finished pellets.

3 Claims, 1 Drawing Sheet

ADDITIVE FOR REDUCING THE ROASTING TEMPERATURE OF FLUXED MAGNETITE PELLETS AND A METHOD OF USING IT

TECHNICAL FIELD

The present disclosure relates to an additive for roasting magnetite concentrate pellets, in particular to an additive for reducing a roasting temperature of magnetite concentrate pellets, and further relates to a method for reducing a roasting temperature of magnetite concentrate pellets using additives, falling in the field of iron and steel metallurgy.

BACKGROUND

As a link with the largest emission of harmful dust gases in a steel process, the front-iron process hinders low-carbon environmental protection work, and sintered ore and pellet ore, as the main raw materials for furnace, are the key factors. Compared to the sintered ore, the energy consumption of the pellet ore production is about ½ of the sintering process, the emissions of dust, $SO_2$ and $NO_x$ are about $\frac{1}{7}$, $\frac{1}{3}$ and $\frac{1}{5}$ of the sintering process, and the production process of the pellet ore produces almost no dioxins, which better meets the requirements of the national call for energy conservation and emission reduction. Therefore, the reduction of the usage amount of the sintered ore and the increasing of the proportion of the pellet ore in the furnace are green development paths for today's steel industry.

In order to meet the demand for blast furnace ironmaking and increase the proportion of the pellet ore in the furnace, the focus of research has gradually shifted to flux pellets in recent years. Due to the addition of calcium flux, low melting point substances such as calcium ferrate and fayalite are easily generated during high temperature roasting, resulting in a high amount of liquid phase and bonding phenomenon produced during roasting, which is difficult to control in actual production. In order to alleviate the roasting and bonding problems of fluxed pellets, in general, magnesium-containing flux is added to promote the generation of high melting point substances to improve the performance of the fluxed pellets. The prior technical schemes are as follows.

Scheme I: The pellets are returned to ore, mixed with slaked lime and sodium humate, aged and ball milled, as a composite additive, then added to a pellet raw material for pelletizing and pellet preheating roasting experiments, which reduces a roasting temperature of the pellet by 30 to 50° C. According to Scheme I, low temperature roasting additives generally need to be prepared in advance, and the additives contain a small amount of alkali metal Nat, which may affect the smooth operation of blast furnace during actual industrial production.

Scheme II: The pellet ore is separated during roasting by adding a certain particle size of titanium slag in a rotary kiln to reduce a bonding rate of the pellet ore and alleviate the ring formation of the rotary kiln. According to Scheme II, the roasting and bonding problems between the pellet ore are alleviated by adding external factors, only to some extent, the phenomenon of the ring formation of the rotary kiln is suppressed, and the roasting and bonding problems of the pellet ore are not fundamentally solved. The particle size of titanium slag is small, there may be a trace of the titanium slag adsorbed on the surface of the pellet ore, which affects the quality of the pellet ore.

Scheme III: The deep oxidation and efficient consolidation of the pellet ore are realized by optimizing thermal parameters of the fine-grained magnetite pellet roasting process, such as air temperature, heating speed, material layer height, running speed of chain grate and oxygen content in roasting atmosphere, and controlling oxidation ratios of the pellet ore in the preheating, roasting and cooling stages. Finally, when a roasting temperature of the rotary kiln is 1200° C., an average compressive strength of the pellet ore reaches 2779 N/pc. According to Scheme III, although the deep consolidation of the pellet ore is promoted by changing the thermal parameters and iron ore pellets with higher strength are obtained, the optimization scheme is not necessarily applicable to other types of magnetite.

Scheme IV: After magnesium flux of soft burned dolomite and water are fully digestion, the above magnesium additives, magnetite concentrate, and bentonite are uniformly mixed according to a certain weight ratio, pelletized, roasted and cooled at a roasting temperature of 1190° C. for 9 minutes to obtain high quality magnesium pellet ore with a compressive strength of 2200-2400 N/pc. According to Scheme IV, MgO flux is added to raw material, although high melting point substances can be generated and the bonding problem is reduced to some extent, the addition of $Mg^{2+}$ causes it to enter magnetite lattices and hinder the oxidation and recrystallization of the magnetite to some extent, and an addition amount of MgO flux is not to be too high, so it also has some disadvantages.

SUMMARY

The present disclosure provides an additive for reducing a roasting temperature of magnetite concentrate pellets to overcome the existing problems of high roasting temperatures of oxidized pellets prepared from high-silica magnetite concentrate and low product strength. The additive can significantly reduce the roasting temperature of the pellets by 50-80° C. on average, can significantly reduce the production energy consumption, improve strength indexes of the pellets and alleviate the phenomena of high temperature roasting and bonding.

To achieve the above technical purposes, the present disclosure provides an additive for reducing a roasting temperature of magnetite concentrate pellets, including components: $B_2O_3$ and $Mn_2O_3$. The $B_2O_3$ and $Mn_2O_3$ are chemical analytical reagents, and the additive is formed by mixing $B_2O_3$ with $Mn_2O_3$. A mass percentage of $B_2O_3$ is 0.8% of a dry base mass of magnetite concentrate, and a mass percentage of $Mn_2O_3$ is 4% of the dry base mass of the magnetite concentrate.

In the present disclosure, except that a preheating time of a preheating temperature stage of 600-1000° C. is appropriately extended during preheating, the processes of mixing, pelletizing, drying and oxidation roasting are the same as those of common iron ore pellets roasting in the related art. The magnetite concentrate, bentonite with a dosage of 0.7%, calcium flux and the additive are mixed into a mixture, then water accounting for 12-14% of a dry base mass of the mixture is added, and green pellets with a diameter of 10-12.5 mm are prepared in a disc balling machine, preheated at 600-1000° C. for 15-20 minutes after the completion of drying the green pellets to ensure that $Mn_2O_3$ is fully decomposed, and roasted at 1200° C. for 15 minutes. After roasting, the pellets are cooled to room temperature to obtain finished pellet ore. Then, reference pellets without the addition of $B_2O_3$ and $Mn_2O_3$ are subjected to high-temperature (1250-1280° C.) preheating roasting experiments, and compressive strength tests and mineral phase structure observations are performed after the experiments.

Compared with the related art, the technical solutions of the present disclosure bring the following beneficial technical effects. The greatest advantage of the technical solution of the present disclosure is that the use of the additive can significantly reduce the roasting temperature of the pellets by 50-80° C., can significantly reduce the production energy consumption and improve strength indexes of the pellets. In the present disclosure, the additive for reducing a roasting temperature of magnetite concentrate pellets includes chemical analytical reagents of $B_2O_3$ and $Mn_2O_3$, and the roasting temperature is set below a melting point temperature of a low melting point substance, i.e., 1200° C. A melting point temperature of $B_2O_3$ is 450° C., $B_2O_3$ provides trace fluid phase for the pellets to promote the movement of $Fe^{2+}$ and accelerate the consolidation of solid phase during the preheating. The heating decomposition equation of $Mn_2O_3$ in the literature "STUDY ON THE KINETICS OF LOW TEMPERATURE DECOMPOSITION OF MANGANESE DIOXIDE" is as follows: $6Mn_2O_3 \rightarrow 4Mn_3O_4 + O_2$, a thermogravimetric analysis experiment is performed on $Mn_2O_3$, and a TG curve is shown in FIG. 2. The TG curve indicates that during warming, $Mn_2O_3$ slowly loss weight to be decomposed at a temperature interval of 600-1000° C., and the temperature interval coincides with a preheating temperature interval of magnetite pellets under normal conditions. $O_2$ is slowly released during the preheating, promoting the oxidation and recrystallization of magnetite from an interior.

DETAILED DESCRIPTION

Figure 1:
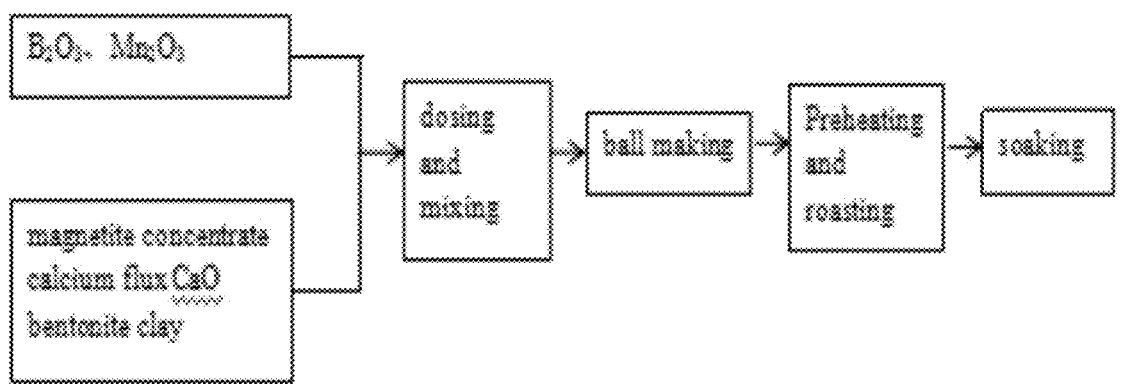
FIG. 1 is a flow chart of a pellet production process according to the present disclosure.
Figure 2:
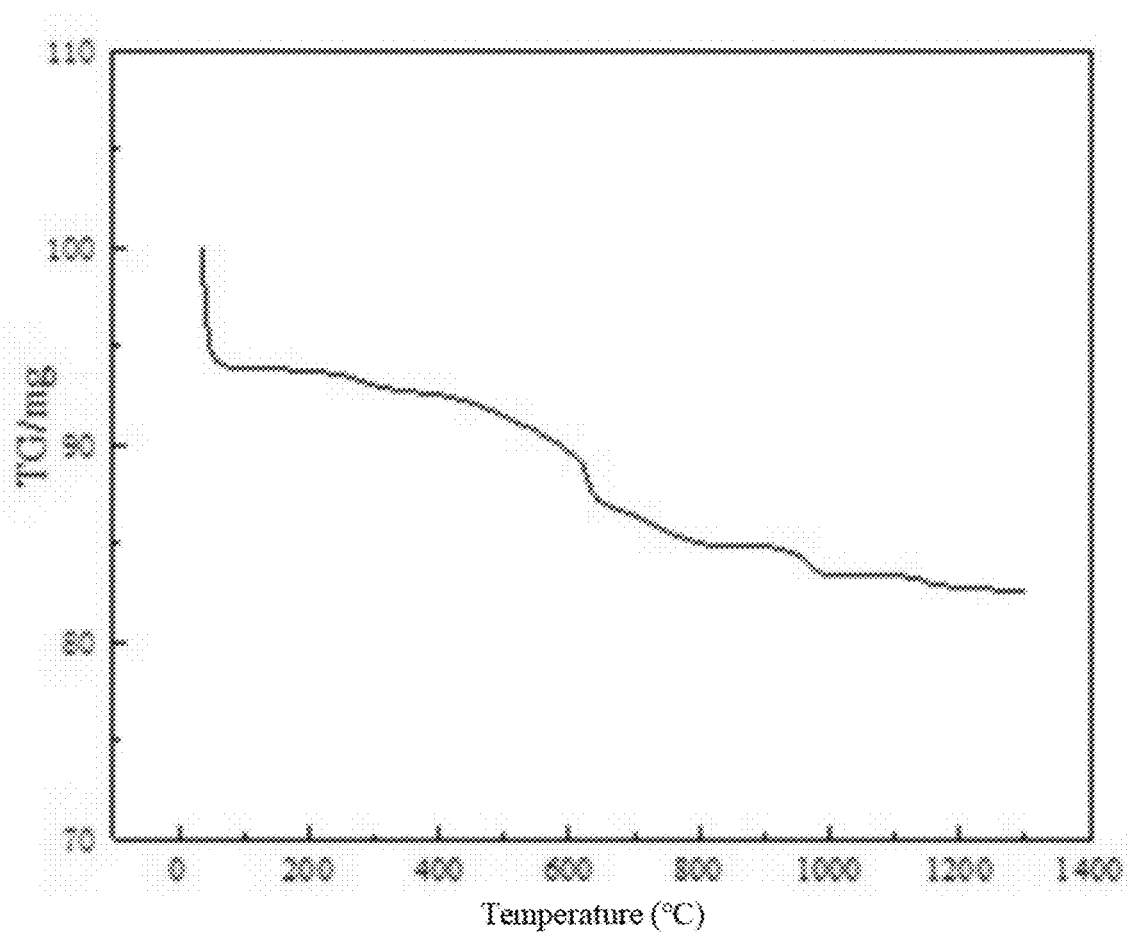
FIG. 2 is a TG graph of a thermogravimetric analysis experiment according to the present disclosure.

Referring to the FIG. 1, a pellet ore production process is performed.

Example 1

Local high-silica magnetite concentrate (66.3% of TFe and 6.17% of $SiO_2$) was used as raw material, 0.7% of bentonite and calcium flux CaO were added and uniformly mixed, no $B_2O_3$ and $Mn_2O_3$ were added, after adding 12-14% of water, and green pellets with a diameter of 10-12.5 mm were prepared in a disc balling machine. A shatter strength of the green pellets was 5 times/pellet (0.5 m), and a compressive strength of the green pellets was 8.2 N. After the green pellets were dehydration and dried, the preheating was performed at 900° C. for 15 minutes, and the roasting was performed at 1200° C. for 15 minutes. An average strength of a roasted finished pellet was 1980 N/pc, and a strength of the pellet ore was lower at this time.

Example 2

Local high-silica magnetite concentrate (66.3% of TFe and 6.17% of $SiO_2$) was used as raw material, 0.7% of bentonite, calcium flux CaO, and 4% of $Mn_2O_3$ were added and uniformly mixed, no $B_2O_3$ was added, after adding 12-14% of water, and green pellets with a diameter of 10-12.5 mm were prepared in a disc balling machine. A shatter strength of the green pellets was 5 times/pellet (0.5 m), and a compressive strength of the green pellets was 8.4 N. After the green pellets were dehydration and dried, the preheating was performed at 600-1000° C. for 15 minutes, and the roasting was performed at 1200° C. for 15 minutes. An average strength of a roasted finished pellet was 2274 N/pc, and a strength of the pellet ore was slightly higher at this time.

Example 3

Local high-silica magnetite concentrate (66.3% of TFe and 6.17% of $SiO_2$) was used as raw material, 0.7% of bentonite, calcium flux CaO, 0.8% of $B_2O_3$ were added and uniformly mixed, no $Mn_2O_3$ was added, after adding 12-14% of water, and green pellets with a diameter of mm were prepared in a disc balling machine. A shatter strength of the green pellets was 6 times/pellet (0.5 m), and a compressive strength of the green pellets was 9.1 N. After the green pellets were dehydration and dried, the preheating was performed at 900° C. for 15 minutes, and the roasting was performed at 1200° C. for 15 minutes. An average compressive strength of the pellet ore was 2631 N/pc, and a strength of the pellet ore was high at this time.

Example 4

Local high-silica magnetite concentrate (66.3% of TFe and 6.17% of $SiO_2$) was used as raw material, 0.7% of bentonite, calcium flux CaO, 0.8% of $B_2O_3$, and 4% of $Mn_2O_3$ were added and uniformly mixed, after adding 12-14% of water, and green pellets with a diameter of 10-12.5 mm were prepared in a disc balling machine. A shatter strength of the green pellets was 6 times/pellet (0.5 m), and a compressive strength of the green pellets was 9.3 N. After the green pellets were dehydration and dried, the preheating was performed at 600-1000° C. for 15 minutes, and the roasting was performed at 1200° C. for 15 minutes. An average strength of a roasted finished pellet was 2962 N/pc, and a strength of the pellet ore was very high at this time.

Example 5

Local high-silica magnetite concentrate (66.3% of TFe and 6.17% of $SiO_2$) was used as raw material, 0.7% of bentonite, calcium flux CaO were added and uniformly mixed, no $B_2O_3$ and $Mn_2O_3$ were added, after adding 12-14% of water, and green pellets with a diameter of 10-12.5 mm were prepared in a disc balling machine. A shatter strength of the green pellets was 6 times/pellet (0.5 m), and a compressive strength of the green pellets was 9.5 N. After the green pellets were dehydration and dried, the preheating was performed at 900° C. for 15 minutes, and the roasting was performed at 1280° C. for 15 minutes. An average strength of a roasted finished pellet was 3063 N/pc, and a strength of the pellet ore was the highest at this time.

A macro strength indicates: $B_2O_3$ and $Mn_2O_3$ have a promoting effect on oxidation and recrystallization processes of magnetite at a low temperature, but promotion methods are different. $Mn_2O_3$ promotes the oxidation and recrystallization of magnetite in the gas phase, and $B_2O_3$ promotes the movement of $Fe^{2+}$ in the liquid phase and accelerates the consolidation of solid phase. The combined promotion effect of the additives is greater than that of a single additive, and the macro strength results indicates that the compressive strength of the pellet ore at 1200° C. after adding the additives is basically the same as the compressive strength of roasted sample pellet ore at 1250-1280° C.

The traditional method for reducing a bonding rate of fluxed pellets during high temperature roasting is to add MgO flux into the pellets to produce a high melting point substance, which makes it unsuitable for bonding at high temperatures. Traditional oxidation roasting of the magnetite pellets is performed layer by layer from outside to inside.

Calcium ferrate systems, such as $CaO \cdot Fe_2O_3$, $CaO \cdot 2Fe_2O_3$, $CaO \cdot Fe_2O_3$—$CaO \cdot 2FeO$ eutectic mixtures, all have low melting points of 1216° C., 1226° C. and 1205° C., which can play a role in promoting the bonding of iron ore particles and increasing the strength of the pellets with an appropriate amount of liquid phase during the high temperature oxidation roasting of the pellets. However, during the roasting of the pellets, the amount of liquid phase not only needs to be strictly controlled, but also the amount of calcium ferrate liquid phase is difficult to control. Too much liquid phase will lead to pellet bonding and porosity reduction, contrarily, the metallurgical property of the pellets is deteriorated.

According to the disclosure, oxide additives are mixed into pellet raw materials to cause the same to be fully decomposed during the preheating roasting to generate $O_2$, which is performed from inside and outside to promote the oxidation and recrystallization of the magnetite, ensuring that the roasting strength of the magnetite at a high temperature (1250-1280° C.) can be maintained at a low temperature (1200° C.) and reducing the bonding rate of the pellet ore at the same time.

According to the disclosure, starting from a root cause, the strength of the pellets is increased as much as possible by adding other additives while appropriately lowering the roasting temperature of the pellets. The amount of liquid phase generation at high temperatures is fundamentally controlled to avoid bonding problems. While the reduction of the roasting temperature of the pellet ore is also conducive to energy saving and consumption reduction, prolong the service life of a device and ensure the smooth roasting process, which is of great significance to the industrial production of the pellet ore.

What is claimed is:

1. An additive for reducing a roasting temperature of fluxed magnetite pellets, comprising components: $B_2O_3$ and $Mn_2O_3$;
    the $B_2O_3$ and $Mn_2O_3$ being chemical analytical reagents, and the additive being formed by mixing $B_2O_3$ with $Mn_2O_3$;
    a mass percentage of $B_2O_3$ being 0.8% of a dry base mass of magnetite concentrate, and a mass percentage of $Mn_2O_3$ being 4% of the dry base mass of the magnetite concentrate; and
    a preheating time of a preheating temperature stage of 600-1000° C. being extended to cause $Mn_2O_3$, at 600-1000° C., to lose weight and be decomposed to release $O_2$, promoting the oxidation and recrystallization of magnetite from an interior, and the roasting temperature being set below a melting point temperature of 1200° C. of a low melting point substance.

2. A using method for an additive for reducing a roasting temperature of fluxed magnetite pellets according to claim 1, comprising following steps: mixing magnetite concentrate, bentonite, calcium flux, and the additive into a mixture, then adding water accounting for 12-14% of a dry base mass of the mixture, preparing a same into green pellets with a diameter of 10-12.5 mm in a disc balling machine, preheating the green pellets at 600-1000° C. for 15-20 minutes after completion of drying the green pellets to ensure that $Mn_2O_3$ is fully decomposed, then roasting a same at 1200° C. for 15 minutes, and after roasting, cooling the pellets to a room temperature to obtain finished pellet ore.

3. The using method for an additive for reducing a roasting temperature of fluxed magnetite pellets according to claim 2, wherein a dosage of the bentonite is 0.7% of the dry base mass of the mixture.

* * * * *